(12) United States Patent
Hoffman et al.

(10) Patent No.: US 12,154,146 B2
(45) Date of Patent: Nov. 26, 2024

(54) AUTOMATED CUSTOMER REVIEW MATCHING

(71) Applicant: ServiceTitan, Inc., Glendale, CA (US)

(72) Inventors: David Hoffman, Glendale, CA (US); Lusine Martirosyan, Glendale, CA (US); Hemant Kashyap, Glendale, CA (US)

(73) Assignee: ServiceTitan, Inc., Glendale, CA (US)

( * ) Notice: Subject to any disclaimer, the term of this patent is extended or adjusted under 35 U.S.C. 154(b) by 125 days.

(21) Appl. No.: 17/506,000

(22) Filed: Oct. 20, 2021

(65) Prior Publication Data

US 2022/0122134 A1 Apr. 21, 2022

Related U.S. Application Data (60) Provisional application No. 63/094,256, filed on Oct. 20, 2020.

(51) Int. Cl.
| | | |
|---|---|---|
| *G06Q 30/00* | (2023.01) | |
| *G06F 16/908* | (2019.01) | |
| *G06F 16/951* | (2019.01) | |
| *G06N 5/04* | (2023.01) | |
| *G06N 20/00* | (2019.01) | |
| *G06Q 30/0282* | (2023.01) | |

(52) U.S. Cl.
CPC ....... *G06Q 30/0282* (2013.01); *G06F 16/908* (2019.01); *G06F 16/951* (2019.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2013/0018699 A1 | 1/2013 | Stibel | |
| 2014/0114876 A1* | 4/2014 | Montano | G06Q 30/0282 705/347 |
| 2014/0351079 A1* | 11/2014 | Dong | G06Q 30/0282 705/26.7 |
| 2015/0161686 A1 | 6/2015 | Williams et al. | |
| 2016/0005084 A1* | 1/2016 | Ryan | G06Q 30/0277 705/14.54 |
| 2016/0180413 A1 | 6/2016 | Tang | |
| 2018/0307739 A1* | 10/2018 | Grochocki, Jr. | G06F 16/29 |
| 2020/0020179 A1* | 1/2020 | Advani | G06N 20/00 |
| 2020/0098018 A1 | 3/2020 | Narula | |
| 2021/0112057 A1* | 4/2021 | Secunda | H04W 12/104 |
| 2021/0224832 A1* | 7/2021 | Li | G06F 40/30 |

* cited by examiner

*Primary Examiner* — Matthew T Sittner
(74) *Attorney, Agent, or Firm* — BakerHostetler (57) ABSTRACT

The subject disclosure encompasses solutions for matching customer information with customer reviews. A process of the disclosed technology includes steps for aggregating customer data associated with a customer, retrieving a plurality of customer reviews, wherein each of the customer reviews describe customer satisfaction with a service provided by a corresponding service provider, extracting review metadata for each of the plurality of customer reviews, and matching the customer with at least one of the customer reviews based on the customer data and the extracted review metadata. Systems and machine-readable media are also provided.

11 Claims, 5 Drawing Sheets

AUTOMATED CUSTOMER REVIEW MATCHING

CROSS-REFERENCES TO RELATED APPLICATIONS

This application claims the benefit of and priority to U.S. Provisional Application 63/094,256, filed on Oct. 20, 2020, which is incorporated by reference herein in its entirety and for all purposes.

BACKGROUND

1. Technical Field

The subject technology provides solutions for matching user generated content with the user/author and in particular, for matching user generated customer reviews with specific customer identities.

2. Introduction

Conventional review services typically receive and serve user (customer) generated content regarding customer consumption of various goods and/or services. While conventional review services often enable the customer to identify the business associated with the review, such services do not provide a way to match the review with the customer, or with a specific service provider (e.g., plumber, repair technician, mechanic, or waiter, etc.).

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Conventional online review services do not offer businesses or service providers the ability to associate customer identities with corresponding (user/customer generated) reviews. The ability to make such associations is difficult for several reasons. First, customers often use aliases, such as an online handle or username that makes it difficult to identify which reviews correspond to a given customer. Second, reviews may pertain to specific service providers (e.g., plumbers, mechanics, carpenters, waiters, barbers, or massage therapists, etc.), that are not explicitly mentioned (named) in the review, making it difficult to associate the customer's experience with the person responsible for providing the goods/services.

Aspects of the disclosed technology address the foregoing limitations by providing solutions for matching online customer reviews with customer/user identities. As discussed in further detail below, the disclosed matching process can include the use of machine-learning models, for example, that are trained and optimized to match customer data inputs with reviews, based on the customer data and review data or review metadata. By matching customer generated review content with customer identities, such systems can be used to better understand the performance of specific service providers, for example, based on a priori knowledge of which providers delivered what service to each customer.

Figure 1:
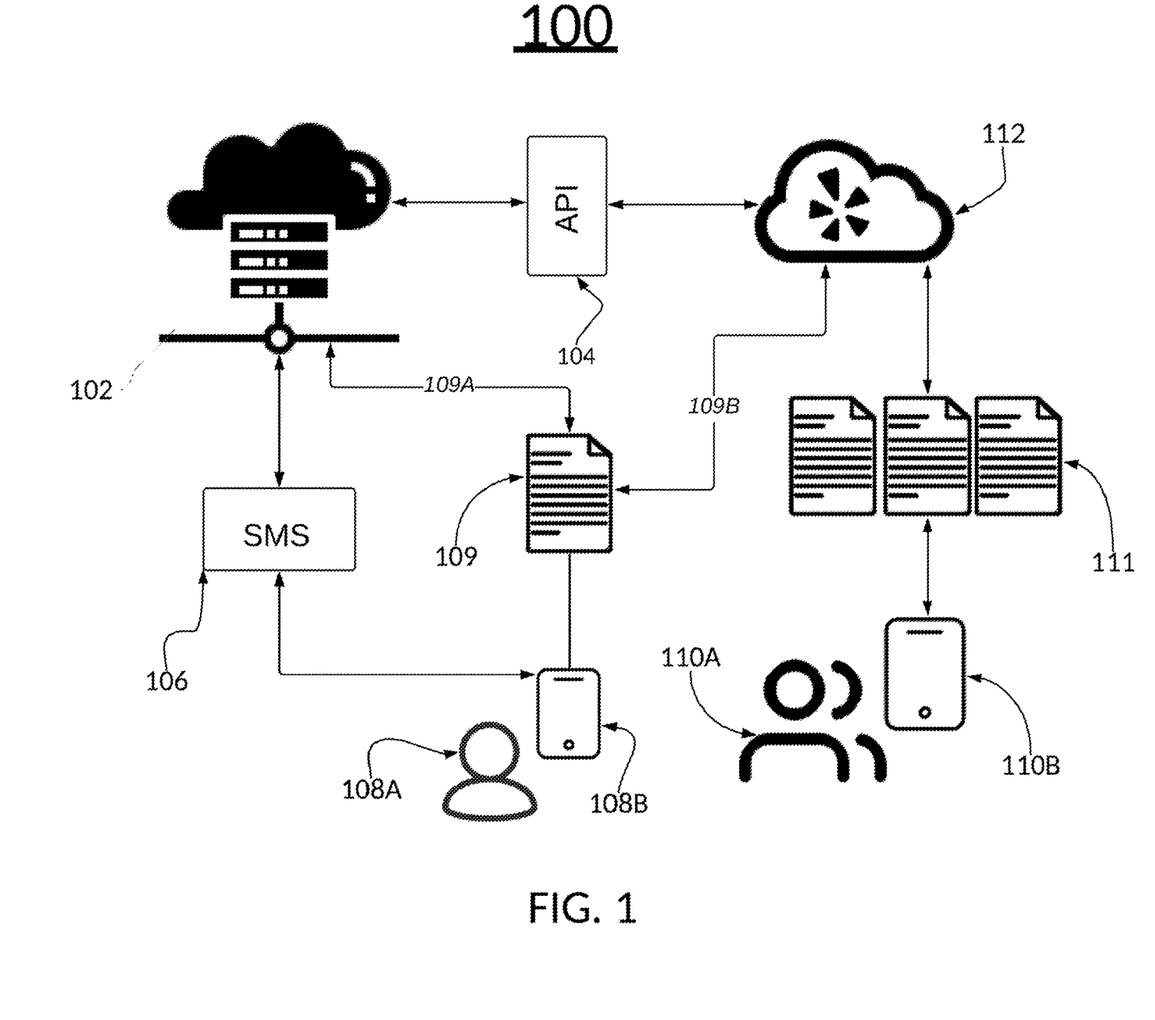
FIG. 1 illustrates an example of a network environment in which a matching platform may be implemented, according to some aspects of the disclosed technology.

FIG. 1 illustrates an example network environment 100 in which a review matching platform 102 can be implemented, according to some aspects of the technology. Matching platform 102 is configured to receive, parse, and process various types of data necessary to match customers with review content items, e.g., customer reviews. In the examples that follow, customer review content may include customer reviews that have been posted to one or more third-party websites or review services. However, the disclosed review matching technology may be used to match customers with various customer generated reviews, irrespective of the location of such reviews, or the nature of the hosting service. Additionally, as discussed in further detail below, matching may be performed between customers, reviews, and service providers. That is, customer identities may be matched with identities of individual providers (e.g., service technicians, wait staff, intake clerks, etc.), that personally interacted with the customer during the course of a transaction.

As illustrated, review matching platform 102 is communicatively coupled with third-party review service 112 (e.g. via an API 104). In the illustrated configuration, review matching platform 102 is configured for communication with a customer, e.g. via client device 108. As used herein, client device/s and/or mobile-devices (e.g., 108, 110), can include any of a variety of processor-based network connected devices, including, but not limited to: smartphones, smart watches, personal computers (PCs), tablet computers, notebook computers, or the like. As illustrated, communication between review matching platform 102, and customer 108 can occur over a variety of communication channels including one or more computer networks (e.g., the Internet), and/or via telephone network or cellular-based services, such as a Short Messaging Service (SMS). In some aspects, communications between review matching platform 102 and client device 108 may be facilitated by an application (app) that is executed on client device 108.

In practice, review matching platform 102 can be configured to track services provided to various customers of platform 102. By way of example, customers affiliated with matching platform 102 may be purchasers of any of a variety of products and/or services, such as technical services for home or business repair, e.g., plumbing, heating-ventilation and air-conditioning (HVAC), and/or carpentry services, or the like. By way of further example, customers may also be patrons of various other business types, including but not limited to: restaurants, barber shops, beauty salons, and/or automotive repair businesses, etc. In some aspects, matching platform 102 contains a database of customer data that includes data (and/or metadata) indicating the type of work/ services performed, as well as information identifying service providers who interacted with the customer and/or that were responsible for at least a portion of the customer's service experience. As used herein, customer data can include other types of data collected by platform 102 about the customer. For example, customer data can include, but is not limited to: customer contact information (e.g., email address or telephone number), online aliases (e.g., screen names or profile handles), social platform identities, social platform account participation, location information, relevant date information (e.g., date of contract, date of service, date of payment, date of customer review creation, etc.). In some aspects, customer data can include customer-generated review content that is provided directly to matching platform 102, such as, review text, quantitative ratings (e.g., star ratings), and the like.

In some implementations, review platform 102 can be configured to solicit customer satisfaction (review) information, for example, by providing notifications or reminders to a client device associated with the customer, such as client device 108. In the example illustrated by environment 100, review matching platform 102 can be configured to send a review reminder/communication to customer 108 via a text message e.g., SMS 106. Alternatively, review requests/ reminders may be provided via an application notification, and displayed by an application on client device 108. In response to the reminder communication, customer 108 can provide a review 109 directly to matching platform 102, e.g. via communication channel 109A. In such instances, matching platform 102 may provide an option that permits customer 108 to copy or otherwise forward the review to a third-party service, such as third-party review service 112. Alternatively, customer 108 may separately browse to review service 112 (e.g. via communication pathway 109B), and provide his/her review independently from matching platform 102.

Throughout the review solicitation, collection, and forwarding process, matching platform 102 can collect customer data that can be used to match the customer with one or more customer reviews. The matching process performed by matching platform 102 can be based on a variety of data types. For example, review matching platform 102 can be configured to aggregate customer data associated with customer 108, which may include any data generated and gathered about the customer during the performance of service, and/or any data collected in conjunction with review information later provided by the customer. By way of example, customer data can include, but is not limited to any of: customer name, customer contact information, location, a type of service performed, a cost of service performed, a bill of goods sold, names of service providers associated with the customer job, quantitative review ratings, e.g. star ratings and/or numerical scores, etc. Additionally, customer data may include sentiment analysis information pertaining to the customer's review, for example, that indicates an emotional state or tonality of the customer, based on the word usage (diction) and configuration of the review. Customer data may also include timestamp information indicating a time that the review was left, and/or timestamp information indicating a time that the user was directed/ forwarded third-party review service 112, etc.

In parallel with the collection of customer data, matching platform can also aggregate various customer reviews, for example, that are provided by a review service, such as third-party review service 112, e.g., via an Application Programming Interface (API) 104. After aggregating various customer reviews from review service 112, matching platform 102 can extract review metadata for each of the reviews. As used herein, review data or metadata may include customer review text, business names, service provider names, descriptions of goods/services rendered, timestamps, sentiment analysis scores, quantitative measures of customer satisfaction (e.g. star scores), and the like. Using the customer data and the review data/metadata, matching platform 102 can identify (match) reviews associated with specific services performed for one or more specific customers, such as customer 108. In some aspects, customer/ review matching may be provided as a similarity score or statistical confidence, for example, as a low, medium, or high match probability.

In some aspects, matching platform 102 can also be configured to automatically identify one or more other service providers associated with the service that has been matched to the customer. Depending on the desired implementation, service providers may be identified by name or employee identification number, etc. By way of example, matching platform 102 may identify the name of a plumber or other service technician involved in performing a given service for customer 108. As discussed above, by providing the ability to identify specific service providers, customer feedback can be more readily used to evaluate the performance of certain employees or other professionals.

Figure 2:
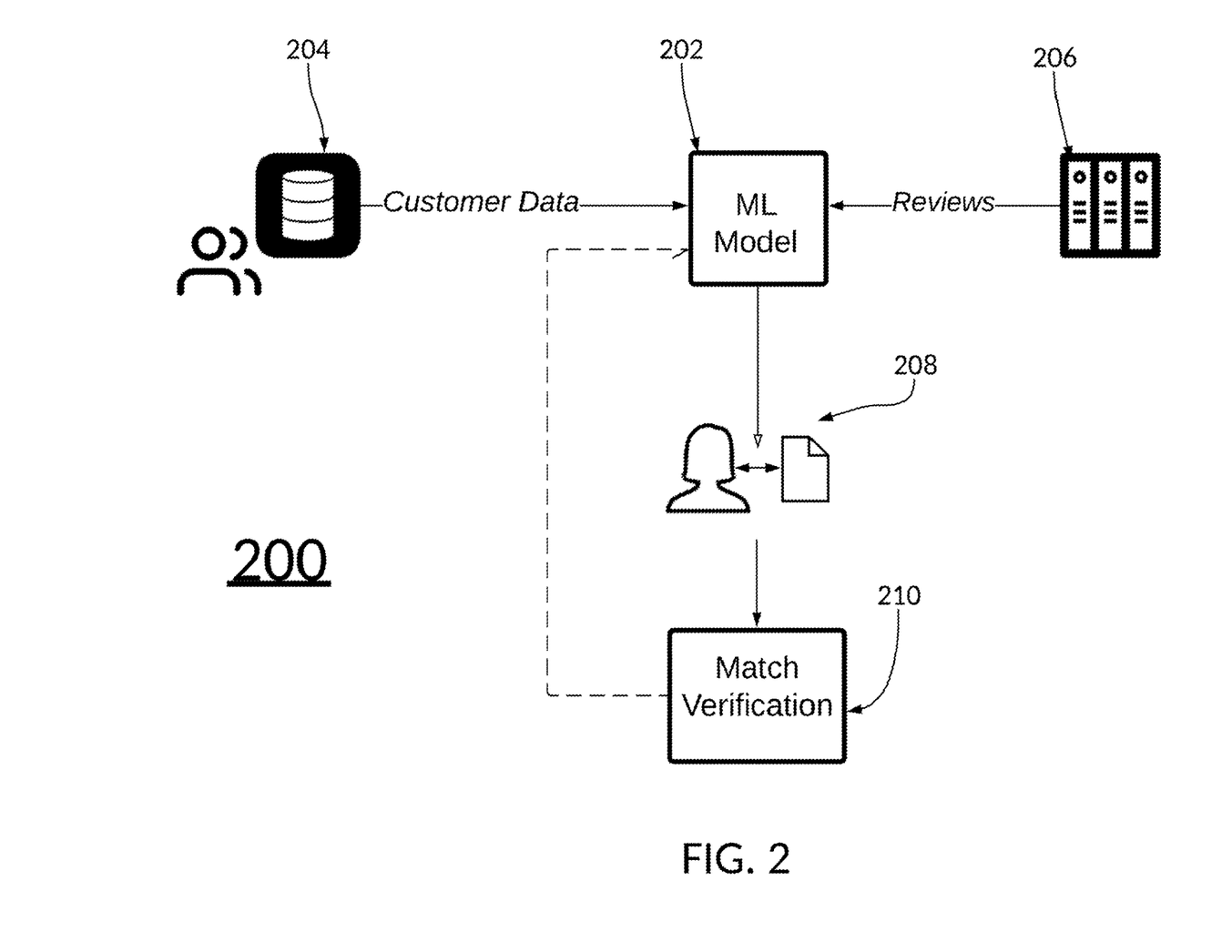
FIG. 2 illustrates an example display that can be used to solicit and receive a customer review at a review matching platform, according to some aspects of the disclosed technology.

FIG. 2 illustrates an example display 200 that can be used to solicit and receive a user/customer review at a review matching platform, according to some aspects of the disclosed technology. Display 200 may be displayed to a customer in conjunction with a review request/reminder communication transmitted from matching platform 102, as described above.

In the illustrated example, display 200 includes a star review selection option, for example, that provides the customer the ability to rate a quality of goods/services received based on a five-star rating system. However, other quantitative measures of customer satisfaction (e.g. rating on a scale of one through ten), are contemplated, without departing from the scope of the disclosed technology. Display 200 includes a text-field 204 that permits text entry by the customer, for example, so that the customer can describe the nature of services/goods purchased, and provide a description of their experience or opinions regarding the associated business and/or service provider. In some aspects, customers may identify the business and/or service provider in text entered into text field 204. In such cases, names and/or other identifying information may be parsed and stored as customer data and/or metadata, as discussed in further detail below. Finally, display 200 also includes a forwarding link 208, for example, that facilitates copying/ forwarding of the customer's textual review to a third-party review service, such as review service 112, as discussed above with respect to FIG. 1.

Customer interaction with any of the various options provided by display 200 may be collected as customer data and/or review metadata. For example, a time stamp associated with user selection of forwarding link 208 may indicate an approximate time in which the same review, or a similar view, was posted to a third-party review service. Such data may be used to determine a statistical likelihood of correspondence between a given customer identity and a specific review retrieved from third-party service. Further details regarding the matching process, as well as the use of machine-learning techniques, are discussed in further detail below with respect to FIG. 3 and FIG. 4.

Figure 3:
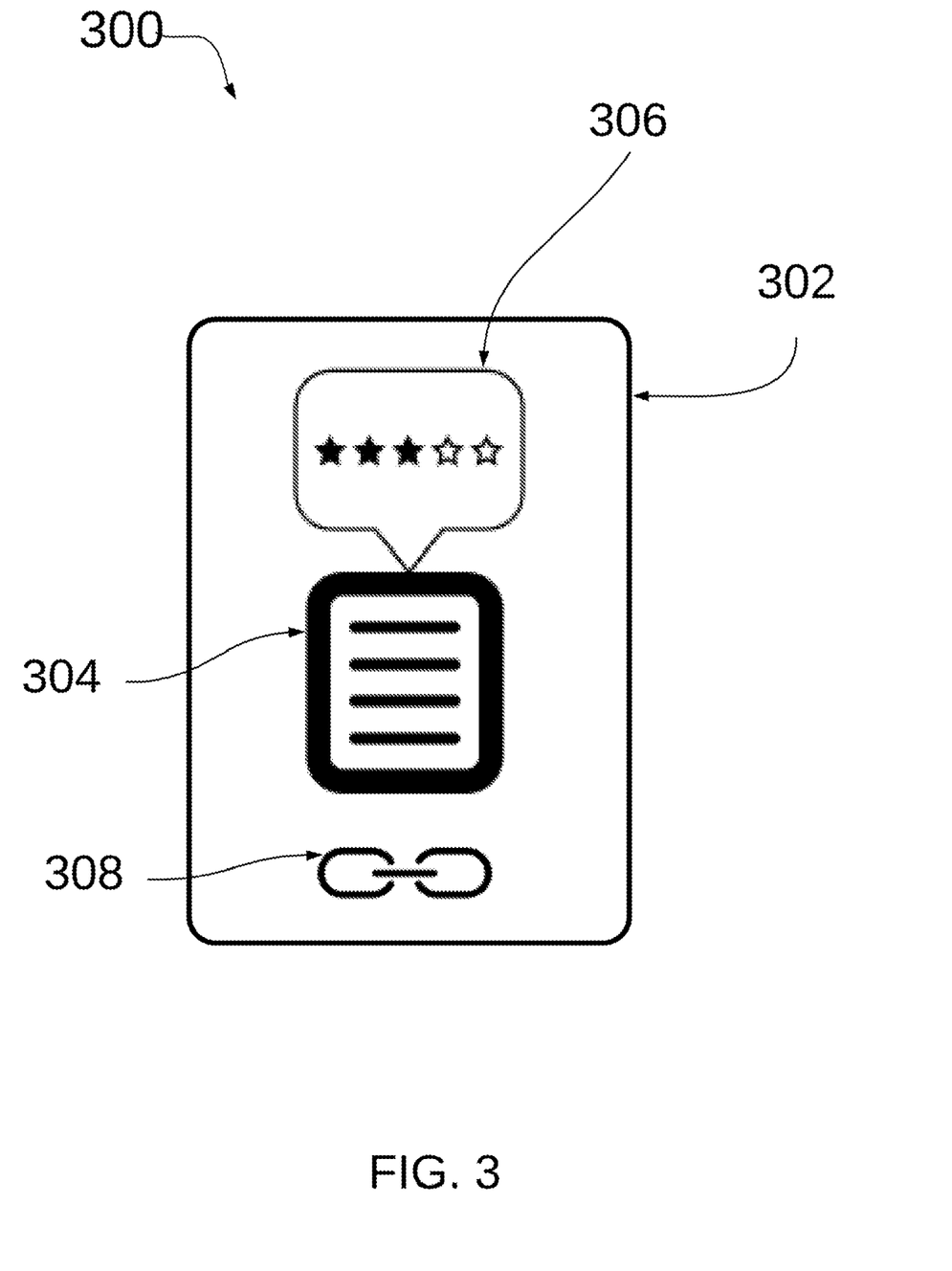
FIG. 3 conceptually illustrates an environment in which a machine-learning model may be implemented for performing a review matching process, according to some aspects of the disclosed technology.

FIG. 3 conceptually illustrates an environment in which a machine-learning model may be implemented for performing a review matching process, according to some aspects of the disclosed technology. In the example of FIG. 3, machine-learning model 302 is configured to perform a matching process based on customer data 304 and one or more of a plurality of customer reviews 306, e.g., based on review metadata. As discussed above, customer data 304 can include any data (or metadata) indicating the type of work/ services performed, as well as information identifying any service providers that interacted with the customer and/or that were responsible for at least a portion of the customer's experience. Similarly, review data 306 can include any type of data (or metadata) pertaining to a customer review, including but not limited to: timestamps, business names, service provider names, and/or other identifying information, etc.

In practice, machine learning model 302 is configured to ingest customer data 304 and review data 306 and to provide matched outputs (e.g. match 308), that identify associations between specific customers and online review items. In some aspects, outputs from machine-learning model 302 may take the form of statistical confidences or associations between inputs. For example, the match may be provided as a quantitative representation of a statistical correlation between a given customer and amassed review. In other implementations, the output from machine learning model 302 may take the form of a qualitative match confidence, such as "low" indicating a weak correlation, "medium" indicating a moderate correlation, and "high" indicating a strong correlation. As understood by those of skill in the art, machine-learning based classification and matching techniques can vary depending on the desired implementation. For example, machine-learning schemes can utilize one or more of the following, alone or in combination: hidden Markov models, recurrent neural networks, convolutional neural networks (CNNs); deep learning, Bayesian symbolic methods, general adversarial networks (GANs), support vector machines, image registration methods, and/or applicable rule-based systems. Where regression algorithms are used, they may include including but are not limited to: Stochastic Gradient Descent Regressors, and/or a Passive Aggressive Regressor, etc.

In some implementations, a match verification step 310 may be performed, for example to validate matches made by machine-learning model 302. Confirmations (or changes/ disconfirmations) made at verification step 310 may be used to perform ongoing (e.g., online) learning, wherein such changes are used to periodically, or continuously update ML model 302. As such, as verification is performed, ML model can keep adapting to thereby improve accuracy for newly received customer data 304, and review data 306.

Figure 4:
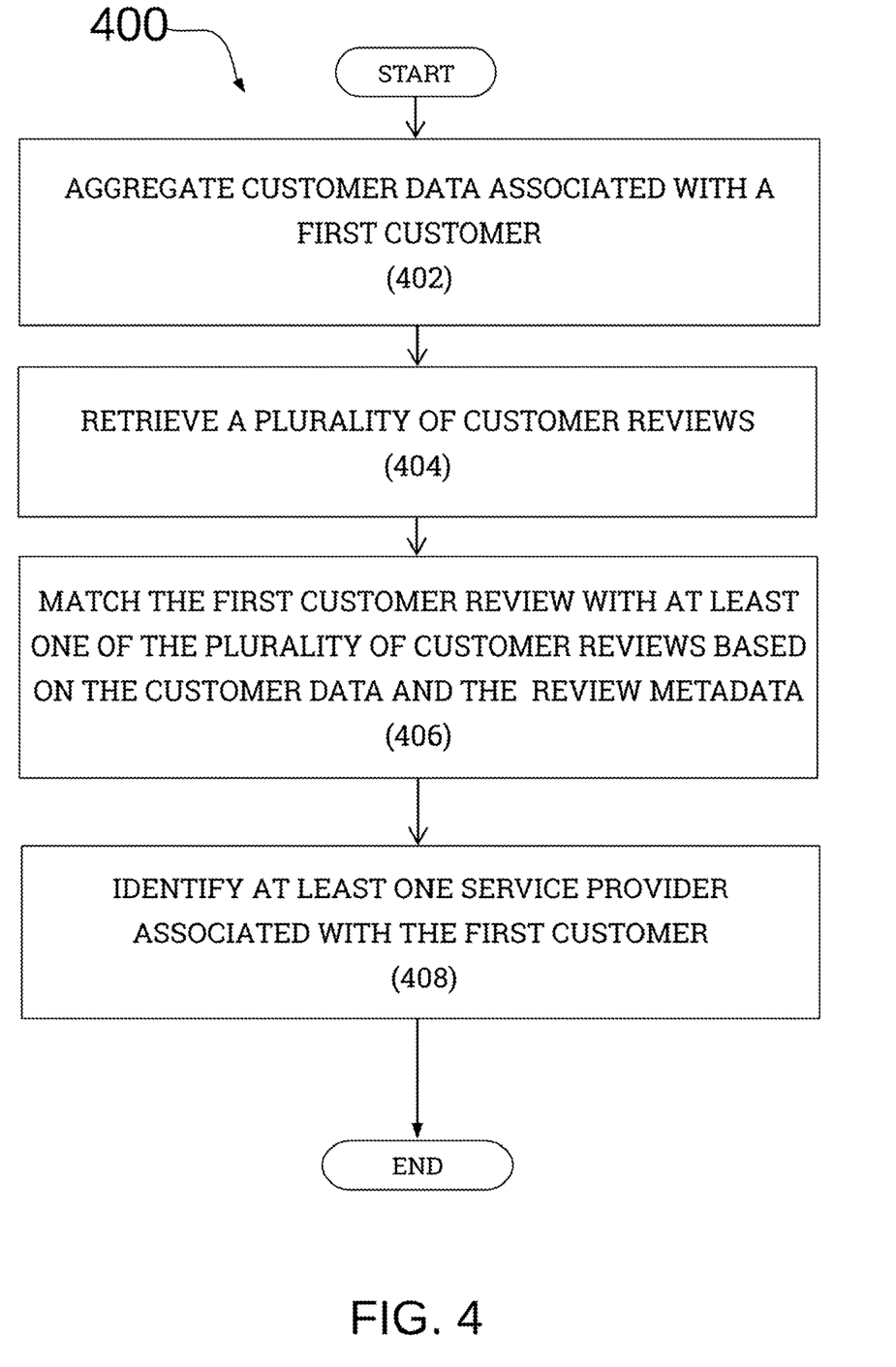
FIG. 4 illustrates steps of an example process for performing user review matching, according to some aspects of the disclosed technology.

FIG. 4 illustrates steps of an example process 400 for performing a user review matching process, according to some aspects of the disclosed technology. Process 400 begins with step 402 in which customer data associated with the first customer is aggregated, e.g., by a matching platform, such as matching platform 102 discussed with respect to FIG. 1. As discussed above, the aggregated customer data can include any type of data (or metadata) regarding the customer (e.g., the customer's name/identity), and/or information about the type of service performed, including any information about service providers involved.

In step 404, customer reviews are received/aggregated by the matching platform. As discussed above, customer reviews may be retrieved from one or more third-party review service providers, such as review service 112 discussed in relation to FIG. 1. In some aspects, reviews may also be received directly by the matching platform, for example, in response to a customer review reminder or notification, as discussed in relation to FIG. 2.

In step 406, customers (e.g., a selected or first customer) is matched with at least one review based on the customer data and the review data or review metadata. As discussed above with respect to FIG. 3, matching may be performed by a machine-learning (ML) model. In some aspects, the ML model may be configured for online or continuous training, such that the accuracy of customer/review matches, once verified, can be used to further train the ML model, for example, by updating one or more weights in a neural-network architecture employed by the model.

In step 408, at least one service provider associated with the first customer is identified. The service provider may be identified from review information provided by the customer, e.g., by using natural language processing to parse a name or other identifying information corresponding with the provider. In other aspects, the service provider may be identified based on customer data, for example, based on the type of work performed for the customer, a time that the work was performed, or a record of the specific provider/ technician that is stored, or accessible by the matching platform.

Figure 5:
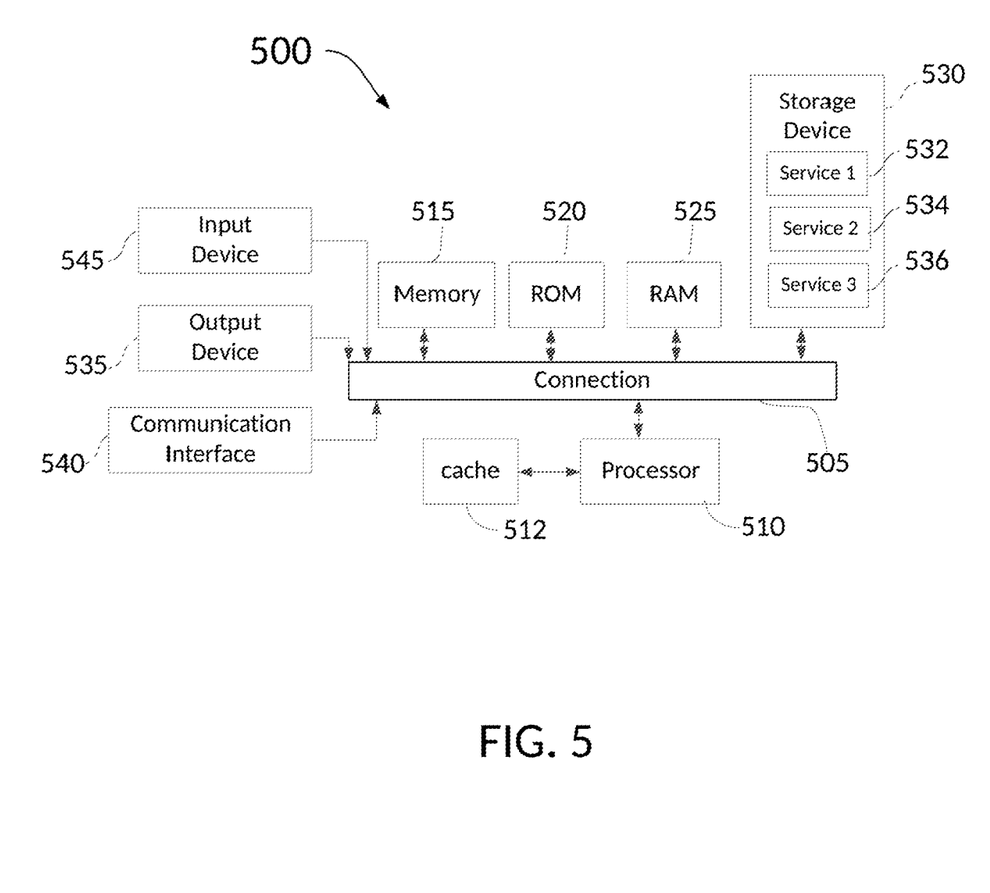
FIG. 5 illustrates an example of an electronic system with which some aspects of the subject technology can be implemented.

FIG. 5 illustrates an example processor-based system with which some aspects of the subject technology can be implemented. For example, processor-based system 500 that can be any computing device that is configured to generate and/or display customized video content for a user and/or which is used to implement all, or portions of, a multimedia editing platform, as described herein. By way of example, system 500 can be a personal computing device, such as a smart phone, a notebook computer, or a tablet computing device, etc. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

By way of example, processor 510 may be configured to execute operations for automatically editing one or more video segments to produce a targeted advertisement. By way of example, processor 510 may be provisioned to execute any of the operations discussed above with respect to process 400, described in relation to FIG. 4. By way of example, processor 510 may be configured to executed operations for aggregating customer data associated with a first customer, retrieving a plurality of customer reviews, wherein each of the customer reviews describe customer satisfaction with a service provided by a corresponding service provider, extracting review metadata for each of the plurality of customer reviews, and matching the first customer with at least one of the plurality of customer reviews based on the customer data and the extracted review metadata for each of the plurality of customer reviews.

In some aspects, matching the first customer with at least one of the plurality of customer reviews may further include operations for identifying at least one service provider associated with the at least one of the plurality of customer reviews.

In some aspects, matching the first customer with at least one of the plurality of customer reviews, may further include operations for providing the customer data and the review metadata to a machine-learning model, receiving, from the machine-learning model, a statistical inference indicating a correlation between the first customer and the at least one of the plurality of customer reviews.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method for matching customer reviews with service providers, comprising:
   sending, by at least one computing device to a client device associated with a first customer, a notification to be displayed via an application executing on the client device, wherein the notification comprises a request for the first customer to review at least one of a service or a good purchased by the first customer;
   aggregating, by the at least one computing device, customer data associated with the first customer, wherein the customer data indicates at least a time that the first customer was directed to an online review service by the at least one computing device, wherein the online review service is communicatively coupled with the at least one computing device via an application programming interface (API);
   retrieving, from the online review service, a plurality of customer reviews;
   extracting review metadata for each of the plurality of customer reviews, wherein the review metadata for at least one customer review of the plurality of customer reviews comprises sentiment metadata, wherein the sentiment metadata indicates at least one of an emotional state or tone associated with the corresponding customer review;
   matching, by a machine learning model, the first customer with at least one of the at least one customer review based at least on the customer data and the extracted review metadata for each of the plurality of customer reviews, wherein matching the first customer with at least one of the plurality of customer reviews comprises:
      providing the customer data and the review metadata to the machine-learning model; and
      receiving, from the machine-learning model, a statistical inference indicating a correlation between the first customer and the at least one of the plurality of customer reviews; and
   updating the machine learning model based on validating the matching of the first customer with the at least one of the at least one customer review.

2. The computer-implemented method of claim 1, wherein matching the first customer with at least one of the plurality of customer reviews, further comprises:
   identifying at least one service provider associated with the at least one of the plurality of customer reviews.

3. The computer-implemented method of claim 1, wherein the customer data comprises a satisfaction score for a service consumed by the first customer.

4. The computer-implemented method of claim 1, wherein the review metadata comprises a name of at least one service provider.

5. A system comprising:
   one or more processors; and
   a computer-readable medium comprising instructions stored therein, which when executed by the processors, cause the processors to perform operations comprising:
      sending, by at least one computing device to a client device associated with a first customer, a notification to be displayed via an application executing on the client device, wherein the notification comprises a request for the first customer to review at least one of a service or a good purchased by the first customer;
      aggregating, by the at least one computing device, customer data associated with the first customer, wherein the customer data indicates at least a time that the first customer was directed to an online review service by the at least one computing device, wherein the online review service is communicatively coupled with the at least one computing device via an application programming interface (API);
      retrieving, from the online review service, a plurality of customer reviews;
      extracting review metadata for each of the plurality of customer reviews, wherein the review metadata for at least one customer review of the plurality of customer reviews comprises sentiment metadata, wherein the sentiment metadata indicates at least one of an emotional state or tone associated with the corresponding customer review;

matching, by a machine learning model, the first customer with at least one of the at least one customer review based at least on the customer data and the extracted review metadata for each of the plurality of customer reviews, wherein matching the first customer with at least one of the plurality of customer reviews comprises:

providing the customer data and the review metadata to the machine-learning model; and receiving, from the machine-learning model, a statistical inference indicating a correlation between the first customer and the at least one of the plurality of customer reviews; and updating the machine learning model based on validating the matching of the first customer with the at least one of the at least one customer review.

6. The system of claim 5, wherein matching the first customer with at least one of the plurality of customer reviews, further comprises:

identifying at least one service provider associated with the at least one of the plurality of customer reviews.

7. The system of claim 5, wherein the customer data comprises a satisfaction score for a service consumed by the first customer.

8. The system of claim 5, wherein the review metadata comprises a name of at least one service provider.

9. A non-transitory computer-readable storage medium comprising instructions stored therein, which when executed by one or more processors, cause the processors to perform operations comprising:

sending, by at least one computing device to a client device associated with a first customer, a notification to be displayed via an application executing on the client device, wherein the notification comprises a request for the first customer to review at least one of a service or a good purchased by the first customer;

aggregating, by the at least one computing device, customer data associated with the first customer, wherein the customer data indicates at least a time that the first customer was directed to an online review service by the at least one computing device, wherein the online review service is communicatively coupled with the at least one computing device via an application programming interface (API);

retrieving, from the online review service, a plurality of customer reviews;

extracting review metadata for each of the plurality of customer reviews, wherein the review metadata for at least one customer review of the plurality of customer reviews comprises sentiment metadata, wherein the sentiment metadata indicates at least one of an emotional state or tone associated with the corresponding customer review;

matching, by a machine learning model, the first customer with at least one of the at least one customer review based at least on the customer data and the extracted review metadata for each of the plurality of customer reviews, wherein matching the first customer with at least one of the plurality of customer reviews comprises:

providing the customer data and the review metadata to the machine-learning model; and receiving, from the machine-learning model, a statistical inference indicating a correlation between the first customer and the at least one of the plurality of customer reviews; and updating the machine learning model based on validating the matching of the first customer with the at least one of the at least one customer review.

10. The non-transitory computer-readable storage medium of claim 9, wherein matching the first customer with at least one of the plurality of customer reviews, further comprises:

identifying at least one service provider associated with the at least one of the plurality of customer reviews.

11. The non-transitory computer-readable storage medium of claim 9, wherein the customer data comprises a satisfaction score for a service consumed by the first customer.

* * * * *